United States Patent [19]
Bell et al.

[11] Patent Number: 5,292,155
[45] Date of Patent: Mar. 8, 1994

[54] METHOD AND APPARATUS FOR MOUNTING AN INSTRUMENT ASSEMBLY ON A MAIN FLOW LINE

[75] Inventors: J. David Bell, Katy; Alan F. Chou; Randall J. Miller, both of Sugar Land, all of Tex.

[73] Assignee: Keystone International Holdings Corp.

[21] Appl. No.: 864,309

[22] Filed: Apr. 6, 1992

[51] Int. Cl.⁵ .......................... F16L 35/00; F16L 3/00
[52] U.S. Cl. .......................... 285/18; 73/756; 285/61; 285/114
[58] Field of Search ............ 73/756, 201; 285/18, 285/61, 93, 114, 219; 137/15

[56] References Cited

U.S. PATENT DOCUMENTS

| Re. 5,255 | 1/1873 | Allenwood | 285/61 |
| 1,076,515 | 10/1913 | Owens | 285/117 |
| 4,466,290 | 8/1984 | Frick | 73/756 |
| 4,467,864 | 8/1984 | Crist | 285/61 |
| 4,672,728 | 6/1987 | Nimberger | 73/201 |
| 4,738,276 | 4/1988 | Adams | 73/756 |
| 4,745,810 | 5/1988 | Pierce et al. | 73/756 |
| 4,833,922 | 5/1989 | Frick et al. | 73/756 |
| 4,920,626 | 5/1990 | Nimberger | 73/201 |
| 4,938,246 | 7/1990 | Conley et al. | 73/756 |
| 5,036,884 | 8/1991 | Miller et al. | 73/756 |

Primary Examiner—Eric K. Nicholson
Attorney, Agent, or Firm—Bush, Moseley & Riddle

[57] ABSTRACT

A stabilized connector assembly (24) for connecting an instrument manifold (26) to an orifice fitting assembly (16) for a main flow passage (10) comprising a pair of generally identical stabilized connector subassemblies (30, 32). Each subassembly (30, 32) includes an elongate connector body (34) having an externally threaded inner end (38) for threaded engagement with an internally threaded outlet port (24) of the orifice assembly (16) and a flanged outer end (40). Bolts (58), jack nuts (68), and collar (78) form stabilizing components connected between the outer flange (40) and the orifice assembly (16) for resisting radial loads from a manifold (26) thereby minimizing any deflection of connector body (34) and resulting stress at inner threaded end (38).

11 Claims, 5 Drawing Sheets

METHOD AND APPARATUS FOR MOUNTING AN INSTRUMENT ASSEMBLY ON A MAIN FLOW LINE

FIELD OF THE INVENTION

This invention relates to a method and apparatus for mounting an instrument assembly on a main flow line at a restriction, such as an orifice fitting assembly, for the transmitting of high and low fluid pressure pulses or signals to a fluid pressure measuring device for measuring the fluid pressure, and more particularly to such a method and apparatus especially designed for transmitting radially directed forces from the instrument assembly to the main flow line.

BACKGROUND OF THE INVENTION

Heretofore, such as shown in U.S. Pat. No. 4,920,626 dated May 1, 1990, apparatus has been provided for mounting an instrument manifold on a main flow line for transmitting radially directed forces between the instrument manifold and an orifice plate assembly or fitting on the main flow line. The mounting apparatus includes a pair of generally identical stabilized connector subassemblies connected between the instrument manifold and the orifice plate assembly with one connector subassembly being connected to a high pressure fluid port on the upstream side of the orifice plate and the other connector subassembly being connected to a low pressure fluid port on the downstream side of the orifice plate. Each connector subassembly comprises a connector body having an inner externally threaded end for threading within an associated fluid port on the orifice assembly and an outer flange for connection to a mating flange on the instrument manifold. The tapered threads on the inner end of the connector body form a fluid tight metal-to-metal seal with the associated fluid port and leakage may occur if such threads crack or are loosened such as might result from radial forces exerted against the connector body and continuous deflection of the connector body from such radial loads or forces.

The stabilized connector shown in U.S. Pat. No. 4,920,626 transmits radial forces from the manifold to an outer end portion of the connector body, and then from the outer end portion to a tensioning nut for transmitting the radial forces to the surface of the orifice assembly at a position radially spaced from the threaded inner end of the connector body thereby to minimize or prevent radial forces from being transmitted through the threaded inner end of the connector body to the orifice assembly. The weight of the manifold and equipment connected thereto, such as fluid pressure transmitters, exerts a static radial load on the stabilized connector. Dynamic radial loads such as provided by vibrations, seismic activity, or exerted by workmen or the like contacting the manifold or associated equipment, may be exerted by the stabilizer connector. A stress concentration resulting from the bending moment generated by the radial loads occurs in the connector body immediately adjacent the tensioning nut. Under prolonged periods of use, particularly when continuous vibrations occur from fluid flow or thermal cycling in the associated main flow line, fatigue may occur in the connector body at the tensioning nut. Also, loosening of the tensioning nut may occur from such use and possible elongation of the connector body from the compressive force exerted by the tensioning nut against the orifice fitting assembly.

Further, when the stabilized connector shown in the aforesaid patent transmits radial loads from the manifold to an arcuate surface of the orifice plate assembly, the stabilizer member contacts the arcuate surface along a line contact area at a location spaced substantially from the threaded end of the connector body thereby to provide a relatively high unit stress thereat.

SUMMARY OF THE INVENTION

The present invention is directed to a method and apparatus including a stabilized connector assembly for connecting an instrument manifold to an orifice fitting assembly on a main flow line and transmitting radial forces from the manifold to the orifice fitting assembly. The stabilized connector assembly includes a pair of generally identical subassemblies with each subassembly having an axially extending connector body with a central bore providing a fluid passage between the orifice and the manifold. Each connector subassembly has an inner end with external threads for threading within an outlet port on the orifice assembly and an outer end with a flange for connection to the manifold.

For stabilizing and strengthening connector body against radial forces from the instrument manifold secured to the outer flange of the connector body, a pair of opposed bolts extend axially from the end flange of the stabilizer body in parallel relation to the longitudinal axis of the stabilizer body to a collar in contact with the surface of the orifice fitting assembly for transmitting radial forces from the manifold to the orifice fitting assembly. The bolts and collar are connected only to the flange of the connector body and are not secured to any other portion of the connector body. The stabilizer body is tensioned along its entire length from a compression of the bolts between the end flange and the orifice fitting assembly. While the connector assembly may be mounted at any desired position about the outer periphery of the orifice fitting assembly, it is normally mounted on a side of the orifice fitting. With a side mounting, the bending moment from radial forces exerted by the manifold is resisted primarily by the lower bolt which acts as a brace. A pair of bolts for each connector subassembly is provided with each pair being aligned transversely of the longitudinal axis of the main flow line to provide upper and lower bolts for a side mounting.

The stabilized connector assembly is adapted for mounting on either a planar surface or an arcuate surface of the orifice fitting assembly. The collar has a planar surface on one end for fitting against a planar surface and an arcuate surface on an opposite end for conforming to and fitting against a mating arcuate surface of the orifice fitting assembly. Thus, a single collar may be used for both an arcuate surface and a planar surface while providing a relatively large surface contact area with the orifice fitting assembly adjacent the inner threaded end of the connector body.

The method for connecting each connector subassembly of the stabilized connector assembly includes the steps of first threading the connector body within an outlet port of the orifice fitting to obtain a metal-to-metal sealing, then aligning the manifold flange with the connector flange, and next securing the manifold flange on the end flange of the connector by the mounting bolts. Next, the U-shaped collar is inserted along the connector body and then the jack nuts are unthreaded to urge the collar into tight engagement with the opposed surface of the orifice fitting assembly. With a side mounting of the manifold, the pair of mounting bolts define upper and lower mounting bolts extending axially in spaced parallel relation to the longitudinal axis of the connector body. The bending moment from the radial forces in a side mounting is resisted primarily by the lower bolt which is placed in compression thereby to minimize deflection of the connector body and any stress concentrations in the connector body.

The stabilizer body of the present invention has opposed flats thereon adjacent the outer flange and a suitable manual wrench can be utilized to thread the stabilizer body tightly within the outlet port of the orifice assembly prior to positioning of the bolts and collar. After the tightening of the stabilizer body and mounting of the manifold, the U-shaped collar is fitted along the stabilizer body and the bolts are then tightened by unthreading of jack nuts against the collar. At times, it may be desirable to electrically insulate the manifold from the orifice fitting and suitable insulating sleeves or bushings may be provided about the bolts at the connector flange. Since a pair of bolts are utilized for tensioning the stabilizer body and resisting radial loads, a bolt may be replaced or an insulating bushing added about the bolt while the other bolt remains in place.

It is an object of the present invention to provide a method and apparatus for mounting an instrument manifold on an orifice fitting assembly of a main flow line particularly designed for the transmitting of radial forces from the instrument manifold to the orifice fitting assembly.

It is a further object of this invention to provide such a method and apparatus including a stabilized connector body having an inner threaded end and an outer flange with force transmitting means between the outer flange and the orifice fitting for transmitting radial loads from the flange to the orifice fitting assembly thereby minimizing radial loads exerted against the connector body and minimizing deflection of the connector body.

Another object of this invention is to provide such a method and apparatus in which radial forces from the manifold are distributed over a relatively large surface area of the orifice fitting assembly for both an arcuate surface and a planar surface on the orifice fitting assembly.

Other objects, features, and advantages of this invention will be apparent from the following drawings and specification.

DESCRIPTION OF THE INVENTION

Figure 1:
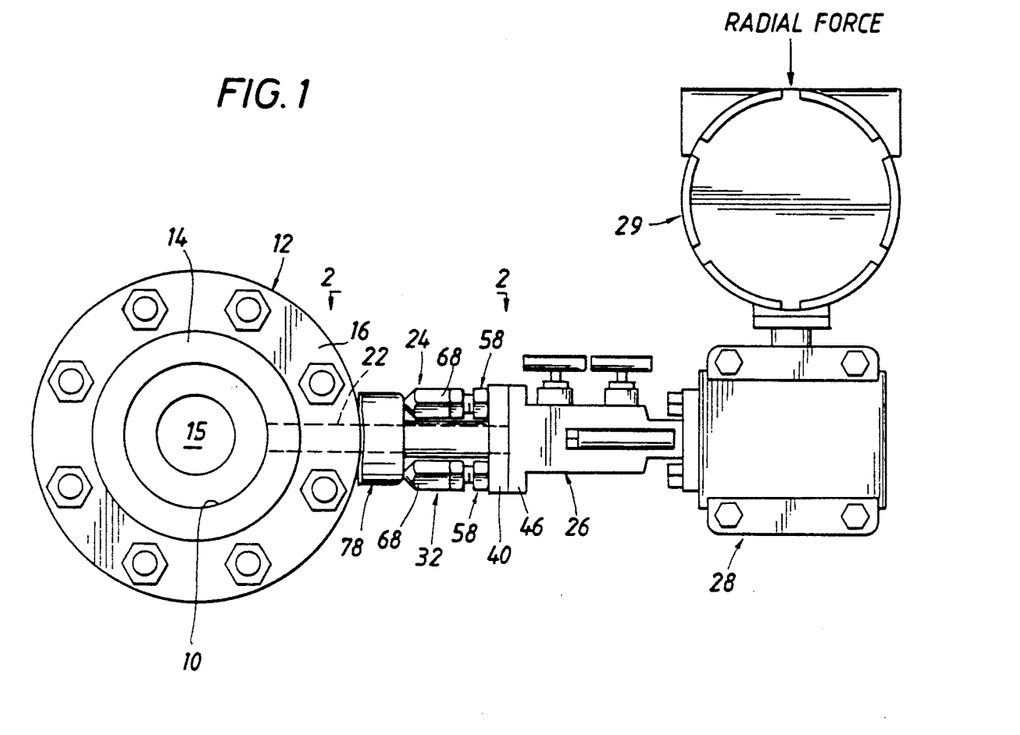
FIG. 1 is an end elevation view of the stabilizer connector assembly comprising the present invention mounted on the side of a main flow line and positioned between an instrument manifold and an orifice fitting assembly for a main flow line.
Figure 2:
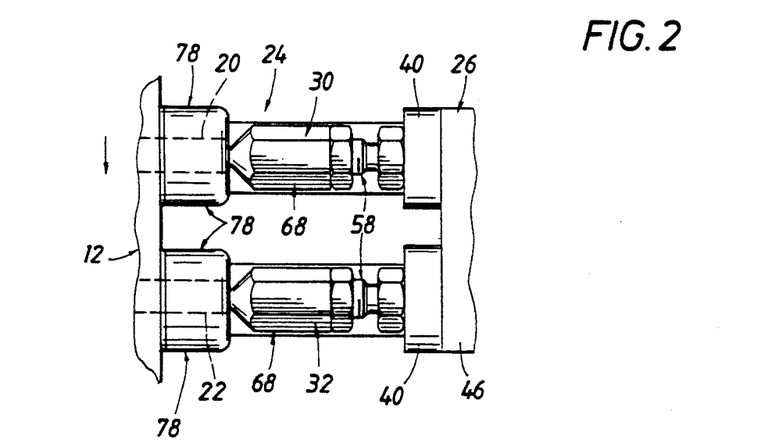
FIG. 2 is a top plan view of the connector assembly shown in FIG. 1 looking generally along line 2—2 of FIG. 1 and showing particularly the two connector subassemblies comprising the connector assembly with one subassembly in fluid communication with high pressure fluid on the upstream side of the orifice and the other subassembly in fluid communication with low pressure fluid on the downstream side of the orifice.

Referring now to the drawings for a better understanding of this invention, and more particularly to FIGS. 1 and 2, an orifice fitting assembly is indicated generally at 12 and is positioned within a main flow line defining a flow passage 10 for the transport of a gaseous or liquid fluid. Orifice fitting assembly 12 is placed within a main flow line for fluid pressure measurements and includes a flow restriction or plate 14 therein having a small diameter orifice 15 therein as well known and fitting between a pair of flanged ends or other retaining members 16 for connection to the main flow line. The term "orifice fitting assembly" is interpreted as including a flow nozzle, venturi tube or other similar restriction. End 16 has an outer arcuate surface 18. A fluid pressure differential is provided on opposite sides of restriction 14 with high pressure fluid on the upstream side and low pressure fluid on the downstream side of restriction 14. High pressure and low pressure fluid outlet ports 20 and 22 are in fluid communication with the main flow line and have internally threaded tapered ends at 23. The direction of fluid flow in the main flow line is shown by the arrow in FIG. 2.

The stabilized connector assembly forming the present invention is shown generally at 24 mounted on a side of orifice fitting assembly 12 and extending laterally therefrom for supporting an instrument assembly including a manifold 26 and fluid pressure transmitter 28 in a cantilevered fashion. Fluid pressure transmitter 28 has an electronic head 29 and is mounted on manifold 26. Fluid pressure pulses or signals from outlet ports 20 and 22 are transmitted to manifold 26 and transmitter 28 for measuring the fluid pressure differential and transmitting the measurement electronically to a remote location. Stabilizer connector assembly 24 includes two generally identical connector subassemblies 30 and 32 with subassembly 30 in fluid communication with high pressure outlet port 20 and subassembly 32 in fluid communication with low pressure outlet port 22. For the purpose of illustration, only subassembly 30 is described in detail as it is understood that subassembly 32 is similar.

Figure 3:
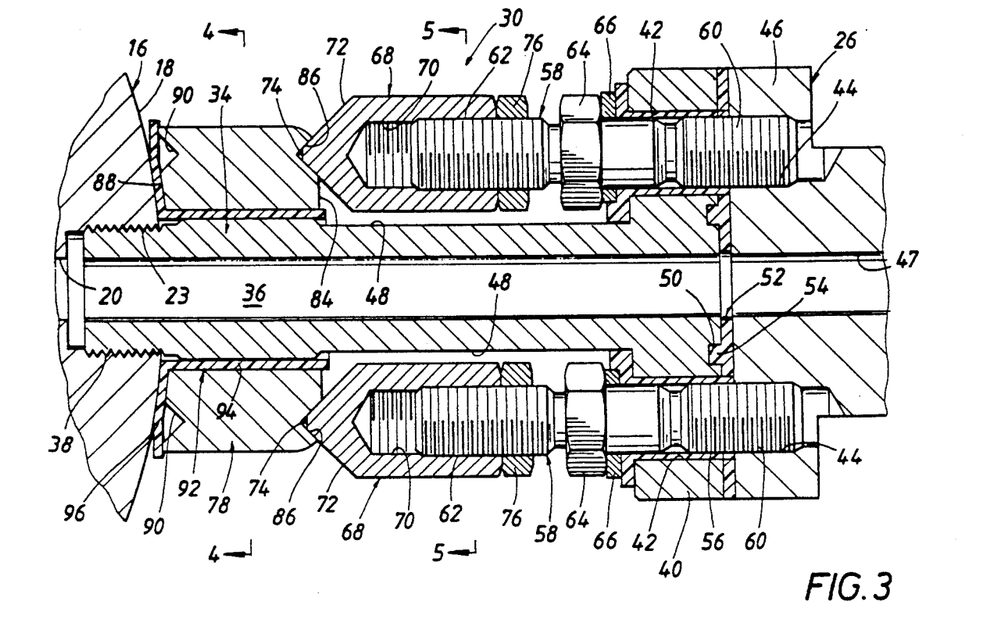
FIG. 3 is an enlarged section view of the connector subassembly shown in FIGS. 2 and 3.
Figure 4:
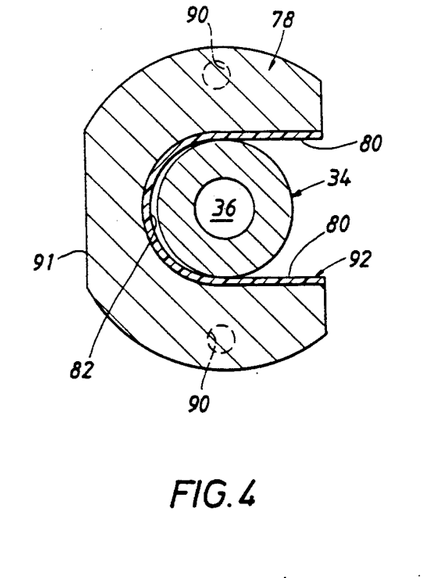
FIG. 4 is a section view taken generally along line 4—4 of FIG. 3.
Figure 5:
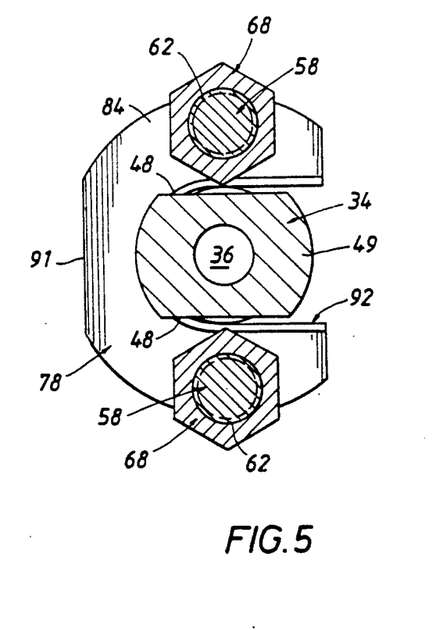
FIG. 5 is a section view taken generally along line 5—5 of FIG. 3.
Figure 8:
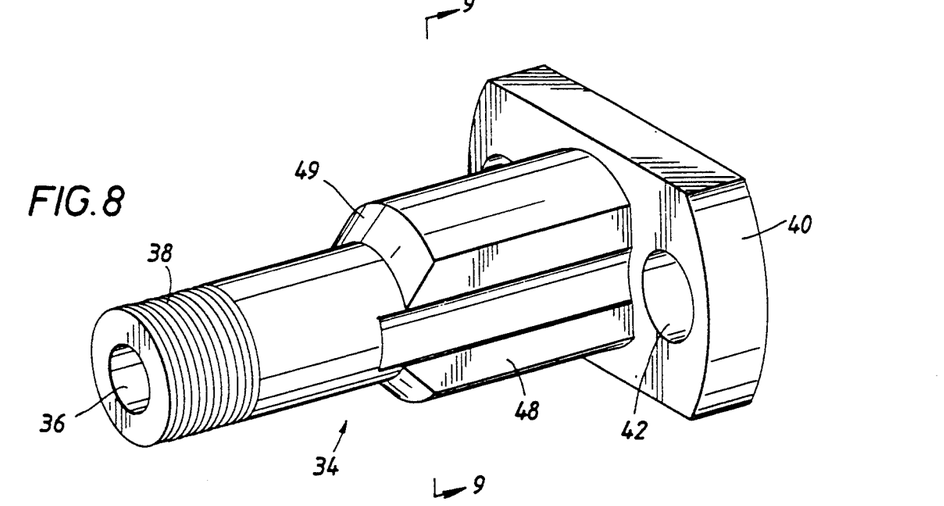
FIG. 8 is a perspective view of a connector body removed from the connector subassembly.
Figure 9:
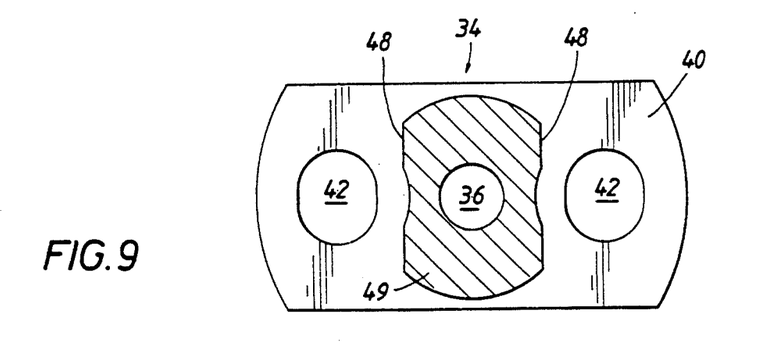
FIG. 9 is a section view taken generally along line 9—9 of FIG. 8.

Subassembly 30 includes an elongate connector body 34 having a central bore 36 therethrough. Connector body 34 has an externally threaded tapered inner end 38 threaded within internally threaded end 23 of outlet port 20 and a flange 40 on an outer end thereof. Flange 40 has a pair of openings 42 adapted for alignment with internally threaded openings 44 in flange 46 of manifold 26 with central bore 36 in axial alignment with fluid inlet port 47 of manifold 26. Connector body 34 has a pair of opposed flats or planar surfaces 48 which are on the upper and lower sides of connector body 34 as shown in FIG. 3 and in FIGS. 8 and 9. An enlarged diameter portion of body 34 is shown at 49 adjacent flats 48 and provides strengthening and rigidity to body 34 thereat, particularly in a direction longitudinally of the flow line. The outer surface of flange 40 has an annular groove 50 therein and a gasket 52 has an annular projection 54 fitting within annular groove 50. Gasket 52 seals between mating aligned flanges 40 and 46. Electrically insulating bushings 56 may be positioned within openings 42 in flange 40 as shown in FIG. 3 if desired to electrically insulate connector body 34. It may be desirable to omit bushings 56 if electrical insulation is not required.

For tensioning connector body 34 along its entire length between threaded inner end 38 and outer flange 40, a pair of bolts 58 are positioned alongside flats 48 on upper and lower sides of connector body 34 as shown in FIG. 3. Each bolt 58 has an externally threaded outer end 60 and an externally threaded inner end 62 with an integral hexagonal nut or flange 64 between threaded ends 60 and 62. A washer 66 is provided between integral nut 64 and flange 40.

Jack nuts are generally indicated at 68 and have internally threaded bores or sockets 70 which engage in threaded relation inner threaded ends 62 of bolts 58. Jack nuts 68 have tapered inner ends 72 terminating at a planar or flat end 74. Lock nuts 76 are threaded on inner threaded ends 62 of bolts 58 and when jack nuts 68 are properly positioned, lock nuts 76 are threaded against jack nuts 68 to maintain jack nuts 68 in position.

Figure 6:
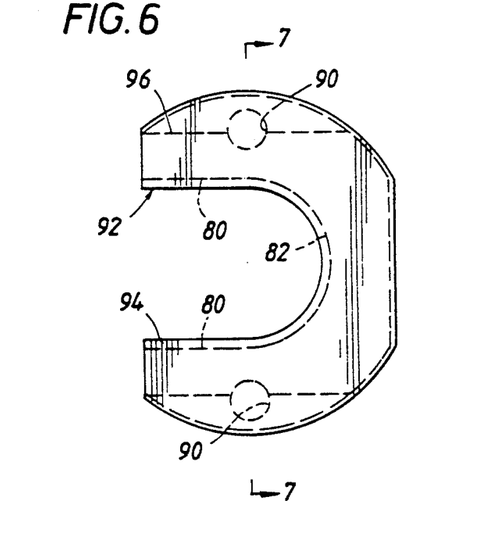
FIG. 6 is a top plan view of a U-shaped collar and gasket fitting around the connector body of the stabilized connector subassembly.
Figure 7:
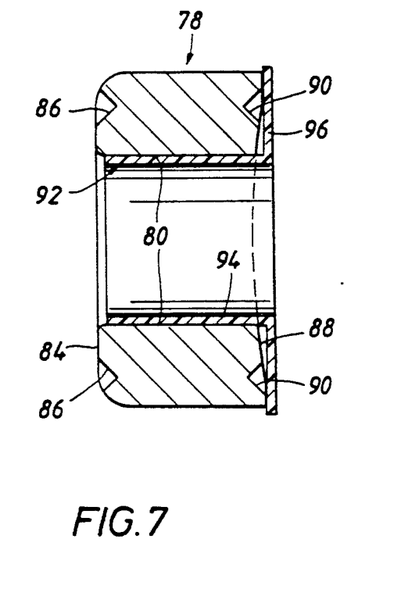
FIG. 7 is a section view taken generally along line 7—7 of FIG. 6.
Figure 11:
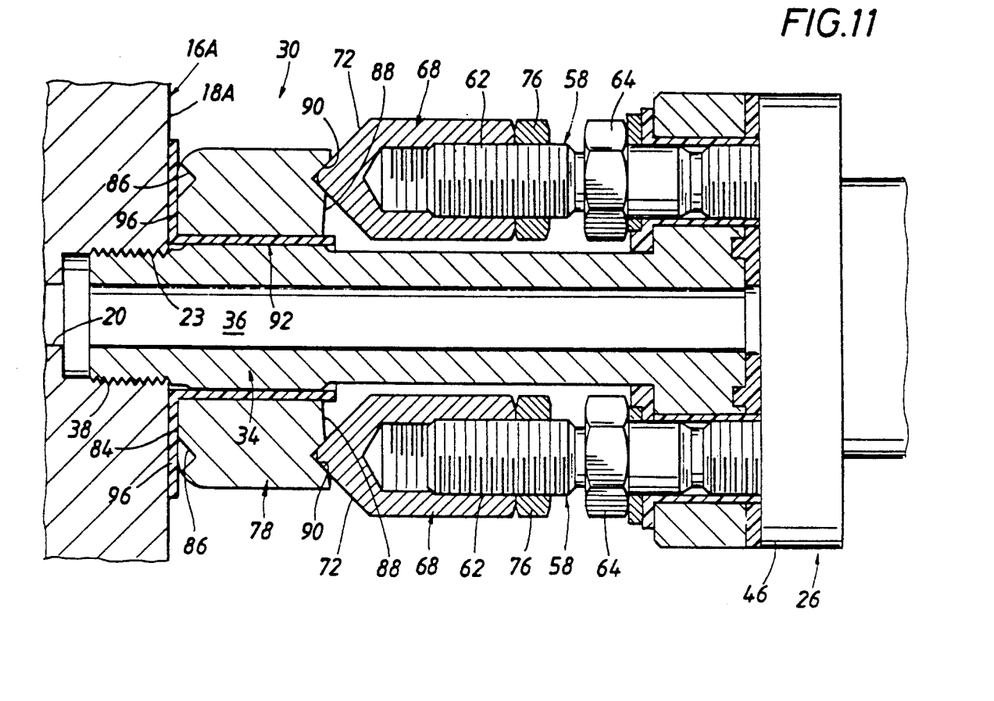
FIG. 11 is an enlarged sectional view of the connector assembly shown in FIG. 3 but fitting against a planar surface of the orifice fitting assembly and with the U-shaped collar reversed so that the planar end surface thereof is in contact with the planar surface of the orifice fitting assembly.

Jack nuts 68 engage a U-shaped metal collar as shown generally at 78 and particularly in FIGS. 6 and 7. U-shaped collar 78 defines a pair of opposed side surfaces 80 connected by an arcuate end surface 82. Arcuate end surface 82 is adapted to fit adjacent connector body 34. Collar 78 has a generally planar upper end surface 84 with dimples or depressions 86 therein to receive inner tapered ends 72 of jack nuts 68. Collar 78 has an arcuate inner end surface 88 which is of a curvature to conform to the adjacent arcuate surface 18 of orifice assembly 16 and has depressions 90 therein adapted to receive the tapered ends 72 of jack nuts 68 when the position of collar 78 is reversed as shown in FIG. 11 and as explained further below. A flat 91 is provided to minimize space requirements for collar 78.

A plastic insert or gasket generally indicated at 92 is preferably used with collar 78 as shown particularly in FIGS. 6 and 7. Gasket 92 includes an upper U-shaped body or sleeve 94 received within the opening in U-shaped collar 78 and fitting against surfaces 80 and 82. A U-shaped flange 96 extends perpendicularly from body 94 and is adapted to fit against the adjacent end surface 88 of U-shaped collar 78. Flange 96 is compressed between lower arcuate surface 88 of U-shaped collar 78 and arcuate surface 18 of orifice fitting 16 as shown in FIG. 3. Gasket 92 is preferably formed of a resilient deformable plastic material, such as Delrin, and in secured position is deformed by collar 78 into conforming relation with the adjacent arcuate surface 18 of orifice assembly 16 closely adjacent threaded end 38 of connector body 34 as shown in FIG. 3 to provide a relatively large surface contacting area with arcuate surface 18. Gasket 92 also provides electrical insulation for collar 78 and under certain conditions may be omitted particularly if electrical insulation if not desired.

Bolts 58 extend axially in parallel spaced relation to the longitudinal axis of connector body 34 between end flange 40 and arcuate surface 18 of orifice fitting 16 and are compressed therebetween when in tightened assembled relation with jack nuts 68 extended. The only connection of bolts 58 and collar 78 to connector body 34 is at flange 40 and radial loads are resisted by bolts 58 at flange 40.

MOUNTING OF STABILIZED CONNECTOR ASSEMBLY

Figure 10:
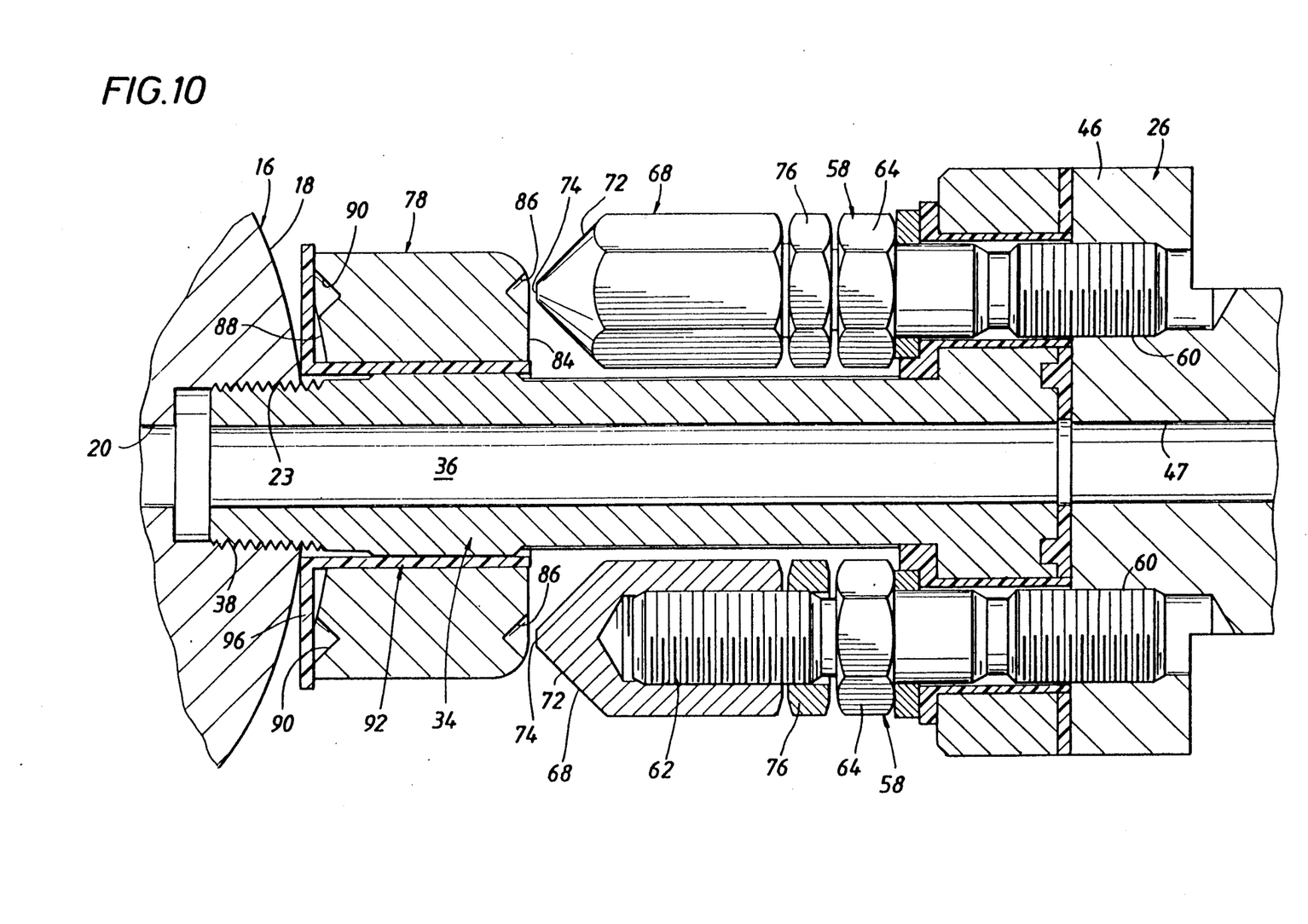
FIG. 10 is an enlarged sectional view similar to FIG. 3 but showing the connector subassembly in a position prior to unthreading of the jack nuts for tightening of the subassembly against the arcuate surface of the orifice fitting.

To connect or mount stabilized connector assembly 24 as shown in FIGS. 1-9 to orifice assembly 16, each subassembly 30, 32 is connected separately between manifold 26 and orifice assembly 16. The assembly steps of subassemblies 30, 32 are similar and only the steps for assembly of subassembly 30 will be explained below as it is understood that similar assembly steps apply to subassembly 32. First, tapered threaded end 38 of connector body 34 is threaded within internally threaded end 23 of outlet port 20 by a suitable wrench engaging flats 48. When adequate metal-to-metal sealing is obtained, openings 42 on flange 40 are aligned with mating internally threaded openings 44 on flange 46 of manifold 26 with flats 48 being on the upper and lower sides of connector body 34. Then, bolts 58 are inserted with threaded ends 60 thereof threaded within the aligned threaded openings 44 of manifold 26 by manual rotation of integral hexagonal nuts 64 on bolts 58 by a suitable wrench thereby to secure manifold 26 onto flange 40 of connector body 34. Next, U-shaped collar 78 and insert 92 are inserted alongside connector body 34 as shown in FIG. 10. Then, jack nuts 68 are unthreaded from bolts 58 to engage indentations 86 in collar 78 to urge collar 78 and gasket 92 into tight contact relation with arcuate surface 18 of orifice assembly 16 for tensioning the entire length of connector body 34. Arcuate surface 88 of collar 78 deforms flange 96 to the curvature of arcuate surface 18 as shown in FIG. 3. Lock nuts 76 are then threaded against jack nuts 68 to maintain the jack nuts 68 in position. A rotational torque of between 10 to 40 foot pounds applied to each jack nut 68 has been found to be adequate to obtain sufficient tensioning of connector body 34 for resisting radial loads and minimizing deflection of connector body 34.

As shown in FIGS. 1 and 2 with connector subassemblies 30 and 32 extending in a generally horizontal direction from a side of orifice fitting assembly 12, manifold 26 and the structure connected thereto exert a static load on subassemblies 30 and 32. Subassemblies 30 and 32 act as cantilevered beams and deflect from the bending moment resulting from radial loads. At times, dynamic loads may be applied against manifold 26 or the components mounted on manifold 26 such as from vibrations resulting from the flow line or from a workman leaning against manifold 26 and substantial dynamic radial loads may result to generate a substantial bending moment. Bolts 58, jack nuts 68, and U-shaped collar 78 as shown in FIG. 3 form force transmitting means and act as stabilizing components for connector body 34 to minimize stress or deflection in stabilizer body 34 which may be transmitted to inner threaded end 38. Thus, the stabilizing components formed by bolts 58 and jack nuts 68 act as braces for connector body 34 to resist radial loads and to minimize any bending moment applied to connector body 34. Since bolts 58 extend between outer flange 40 and are positioned radially outward of connector body 34, the radial loads are resisted at flange 40 of stabilizer body 34 for transmitting the radial loads from flange 40 to surface 18 of orifice assembly 16. None of the stabilizing components are secured or connected to the connector body 34 as the only connection is at outer flange 40. In the event radial loads are exerted against the manifold in a direction parallel to the longitudinal axis of the main flow line, the connector subassembly remote from the radial load acts as a brace for the other connector subassembly.

Stabilized connector subassembly 30 as shown in FIG. 11 is similar to connector subassembly 30 shown in FIG. 3 but is shown as being mounted on a flat or planar surface 18A of orifice fitting 16A with collar 78 reversed. Planar end surface 84 of collar 78 contacts gasket flange 96 for pressing flange 96 into tight contacting relation with flat surface 18A along a relatively large surface contacting area adjacent inner threaded end 38 of connector body 34. The assembly and remaining components of subassembly 30 shown in FIG. 11 are as described in FIGS. 1-10.

Figure 12:
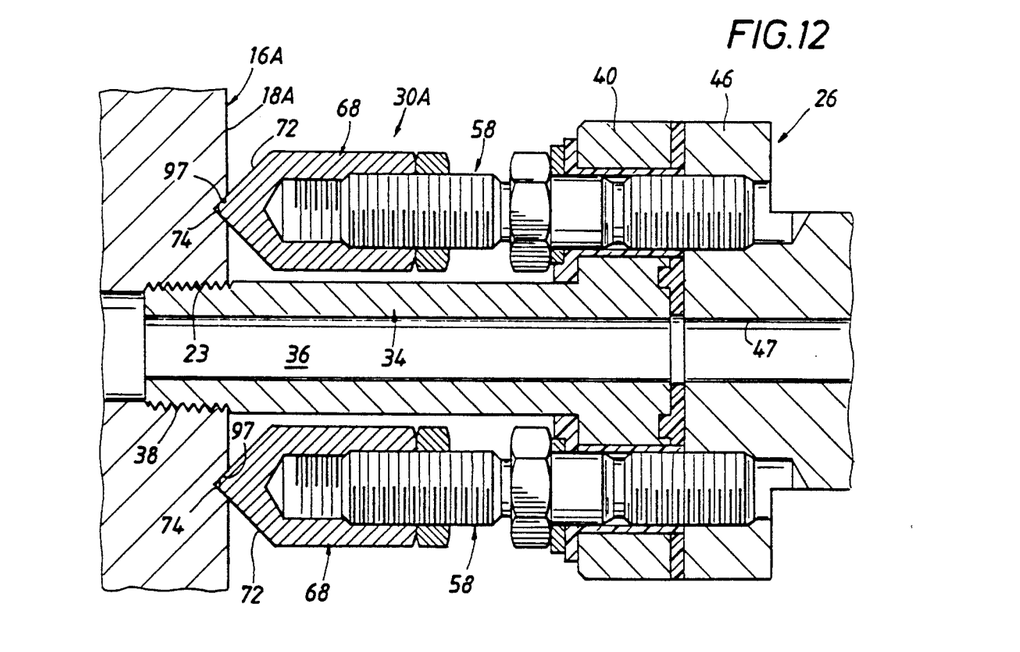
FIG. 12 is a sectional view of a modified connector subassembly in which the U-shaped collar is omitted and the jack nuts are in direct contact with the orifice fitting assembly for transmitting radial loads thereto from the instrument manifold.

Referring to FIG. 12, a modified connector assembly 30A is shown in which the U-shaped collar 78 and U-shaped insert 92 as shown in the embodiment of FIGS. 1-10 are removed and the flats 74 on tapered ends 72 of jack nuts 68 are in direct contact with surface 18A of orifice assembly 16A for transmitting radial loads from flange 40 directly to planar surface 18 of orifice assembly 16A at a location spaced radially from inner tapered end 38 of connector body 34. Suitable indentations 97 may be provided in surface 18A to position and receive tapered ends 72 of jack nuts 68. The remaining components and assembly of the subassembly 30 shown in FIG. 12 are identical to that shown in the embodiment of FIGS. 1-10.

While a pair of force transmitting devices have been shown in the drawings for each connector subassembly, a single force transmitting device under certain conditions with a side mounting of a manifold or other instrument device may be utilized for resisting a substantial portion of radial loads exerted by the manifold. A single force transmitting device would be mounted on the lower side of the connector body and would act as a brace to minimize deflection of the connector body. Also, while the force transmitting devices of the present invention have been shown as being manually actuated in place, it may be desirable under certain conditions to provide force transmitting devices which may be mechanically actuated. Further, the force transmitting device of the present invention may be utilized for mounting instrument devices other than manifold and pressure transmitters in a cantilevered relation on a main flow line from which fluid is transmitted to the instrument device.

While preferred embodiments of the present invention have been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A stabilized connector assembly for connecting an instrument assembly to an orifice fitting assembly mounted within an intermediate portion of a continuous main flow line and for transmitting high and low fluid pressures from a pair of internally threaded fluid outlet ports of the orifice fitting assembly to a pair of aligned fluid inlet ports of the instrument assembly for measuring fluid pressure within said main flow line; said connector assembly comprising:

a pair of generally similar stabilized connector subassemblies positioned generally in side-by-side relation on said orifice fitting asembly and aligned in a direction parallel to the longitudinal axis of said main flow line, one of said subassemblies adapted to receive low pressure fluid and the other of said subassemblies adapted to receive high pressure fluid; each of said connector subassemblies including:

an elongate connector body having an externally threaded inner end for threaded engagement with an internally threaded fluid outlet port of said orifice fitting assembly and a flange on its outer end for connection to said instrument assembly, said elongate connector body having a central bore therethrough in axial alignment with said outlet port of the orifice fitting assembly and a fluid inlet port of said instrument assembly;

a pair of elongate force transmitting means on opposite sides of said connector body extending axially between said outer flange of said connector body and said orifice fitting assembly in spaced parallel relation to the longitudinal axis of said elongate connector body; and means for compressing said pair of force transmitting means between said outer flange and said orifice fitting assembly for directing an axial force against said outer flange with said force transmitting means acting as braces for said connector body and transmitting radial forces from said instrument assembly and said outer flange to said orifice fitting assembly thereby minimizing deflection of said connector body.

2. A stabilized connector assembly as set forth in claim 1 wherein each of said force transmitting means includes a bolt having an externally threaded outer end for threaded engagement with said manifold.

3. A stabilized connector assembly as set forth in claim 2 wherein said bolt has an externally threaded inner end and an integral nut between said threaded ends for manual adjustment of said bolt.

4. A stabilized connector assembly as set forth in claim 3 wherein a manually adjustable jack nut having an internally threaded bore is threaded onto said externally threaded inner end of said bolt and upon manual adjustment against said orifice fitting assembly exerts a compressive force against said bolt for tensioning said connector body.

5. A stabilized connection assembly as set forth in claim 4 wherein a lock nut is threaded onto said inner threaded end of said bolt and is tightened against said jack nut upon adjustment of said jack nut to provide the desired compression of said bolt and the desired tensioning of said connector body.

6. In combination;

a continuous main flow line having an orifice fitting assembly therein forming a restriction in the main flow line including a pair of fluid outlet ports on opposite sides of said restriction for high and low pressure fluids from said main flow line;

an instrument manifold having a flange on one side thereof for connection to a fluid pressure transmitter and a flange on another side thereof for connection to said orifice fitting assembly;

and a stabilized connector assembly between said manifold and said orifice fitting assembly; said connector assembly comprising:

a pair of generally identical connector subassemblies positioned generally in side-by-side relation on said main flow line and aligned in a direction parallel to the longitudinal axis of said main flow line, one of said subassemblies adapted to receive low pressure fluid and the other of said subassemblies adapted to receive high pressure fluid; each of said connector subassemblies including:

an elongate connector body having an externally threaded inner end for threaded engagement with an internally threaded outlet port of said orifice fitting assembly and a flange on its outer end for connection to said manifold, said elongate connector body having a central bore therethrough in axial alignment with said fluid outlet port of said orifice fitting assembly and a fluid inlet port of said manifold; and a pair of generally parallel elongate manually adjustable force transmitting means on opposite sides of said transmitter body extending axially between said outer flange of said connector body and said orifice fitting assembly in spaced parallel relation to the longitudinal axis of said elongate connector body, said pair of force transmitting means being aligned in a direction transverse to the longitudinal axis of said main flow line and upon manual adjustment being compressed between said outer flange and said orifice fitting assembly for directing an axial force against said flange for tensioning said stabilizer body for its entire length, said force transmitting means acting as braces for said connector body and transmitting radial forces from said manifold and said flange to said orifice fitting assembly thereby minimizing deflection of said connector body.

7. The combination as set forth in claim 6 wherein each of said force transmitting means comprises:

a bolt having externally threaded inner and outer ends and an integral nut between said inner and outer threaded ends, said outer threaded end being secured to said manifold; and a manually adjustable jack nut having an internally threaded bore in threaded engagement with said externally threaded inner end of said bolt, said jack nut upon being unthreaded from said threaded inner end of said bolt exerting a compressive force between said bolt and said orifice fitting assembly for tensioning said connector body.

8. A method of connecting an instrument manifold assembly to an orifice fitting assembly mounted within an intermediate portion of a continuous main flow line for transmitting high and low fluid pressure signals from the main flow line to the manifold assembly; said method comprising the following steps:

providing a pair of generally similar stabilized connector assemblies each having an elongate connector body with a central bore therethrough, the connector body having a flange on an outer end and external screw threads on an inner end;

providing a pair of manually adjustable force transmitting devices for each connector subassembly for positioning between the flange of the connector body and the orifice fitting assembly with each force transmitting device including a bolt having an externally threaded outer end;

threading the threaded end of each connector body on an internally threaded fluid outlet port of said orifice fitting assembly to mount the connector bodies in side-by-side relation aligned in a direction parallel to the longitudinal axis of said main flow line;

aligning the flange on the outer end of each connector body with the manifold assembly with openings in the flange of the connector body being aligned with internally threaded openings in said manifold assembly and said central bore of said connector body being in axial alignment with a fluid inlet port of said manifold assembly; and securing the bolt of each of the force transmitting devices under a compressive force between the flange of the connector body and said orifice fitting assembly with said externally threaded outer end of said bolt extending through the opening in the connector flange and being threaded within the opening of said manifold assembly for transmitting radial loads from said manifold assembly and said flange of the connector body to said orifice fitting assembly to minimize deflection of said connector body.

9. The method as set forth in claim 8 further including the steps of:

providing each bolt with an externally threaded inner end;

providing a jack nut having an internally threaded bore for manual threading on said externally threaded inner end of said bolt; and unthreading said jack nut from said bolt against said orifice fitting assembly for exerting a compressive force on said bolt.

10. A stabilized connector assembly for connecting an instrument manifold to an orifice fitting assembly of a main flow line and for transmitting high and low fluid pressures from internally threaded fluid outlet ports of the orifice fitting assembly to fluid inlet ports of the instrument manifold; said assembly comprising:

a pair of generally similar stabilized connector subassemblies positioned generally in side-by-side relation on said orifice fitting assembly, one of said subassemblies adapted to receive low pressure fluid and the other of said subassemblies adapted to receive high pressure fluid; each of said connector subassemblies including:

an elongate connector body having an externally threaded inner end for threaded engagement with an internally threaded fluid outlet port of said orifice fitting assembly and a flange on its outer end for connection to said manifold, said elongate connector body having a central bore therethrough in axial alignment with said outlet port of the orifice fitting assembly and a fluid inlet port of said manifold;

a pair of elongate force transmitting means on opposite sides of said connector body extending axially between said outer flange of said connector body and said orifice fitting assembly in spaced parallel relation to the longitudinal axis of said elongate connector body;

means for compressing said pair of force transmitting means between said outer flange and said orifice fitting assembly for directing an axial force against said outer flange with said force transmitting means acting as braces for said connector body and transmitting radial forces from said manifold and said outer flange to said orifice fitting assembly thereby minimizing deflection of said connector body;

each of said force transmitting means including a bolt having an externally threaded outer end for threaded engagement with said manifold, an externally threaded inner end, and an integral nut between said threaded ends for manual adjustment of said bolt;

a manually adjustable jack nut having an internally threaded bore threaded onto said externally threaded inner end of said bolt for exerting a compressive force against said bolt for tensioning said connector body upon manual adjustment against said orifice fitting assembly; and a lock nut threaded onto said inner threaded end of said bolt and tightened against said jack nut upon adjustment of said jack nut to provide the desired compression of said bolt and the desired tensioning of said connector body.

11. A stabilized connector assembly as set forth in claim 10 wherein a collar is positioned between said jack nut and said orifice fitting assembly to transmit loads from said jack nut to said orifice fitting assembly, said collar having an arcuate surface on an inner end thereof adjacent said orifice fitting assembly adapted to conform to an adjacent arcuate surface of said orifice fitting assembly.

* * * * *